(12) United States Patent
Fan

(10) Patent No.: US 8,257,676 B2
(45) Date of Patent: Sep. 4, 2012

(54) METHOD FOR SYNTHESIZING CARBON NANOTUBES

(75) Inventor: Hongyou Fan, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1008 days.

(21) Appl. No.: 11/560,191

(22) Filed: Nov. 28, 2006

(65) Prior Publication Data

US 2010/0111813 A1    May 6, 2010

(51) Int. Cl.
*C01B 31/02*    (2006.01)
(52) U.S. Cl. .................................... 423/445 R; 502/423
(58) Field of Classification Search .............. 423/445 R; 502/423
See application file for complete search history.

(56) References Cited

U.S. PATENT DOCUMENTS 6,024,899 A * 2/2000 Peng et al. ................... 264/29.1
7,129,554 B2  10/2006 Lieber et al.

OTHER PUBLICATIONS

Pang, J., Li, X., Wang, D., Wu, Z., John, V.T., Yang, Z., and Lu, Y, Silica-Templated Continuous Mesoporous Carbon Films by a Spin-Coating Technique, Adv. Mater., 2004, 16, 11, 884-886.
Shiflett, M.B. and Foley, H.C., Ultrasonic Deposition of High-Selectivity Nanoporous Carbon Membranes, Science, 1999, 285, 1902-1905.
Hampsey, J.E., Hu, Q., Wu, Z., Rice, L., Pang, J., and Lu, Y., Templating Synthesis of Ordered Mesoporous Carbon Particles, Carbon, 2005, 43, 2977-2982.
Zhi, L., Gorelik, T., Wu, J., Kolb, U., and Mullen, K., Nanotubes Fabricated from Ni-Naphthalocyanine by a Template Method, J. Am. Chem. Soc. 2005, 127, 37, 12792-12793.

* cited by examiner

*Primary Examiner* — Stuart Hendrickson
(74) *Attorney, Agent, or Firm* — Elmer A. Klayetter; Kevin W. Bieg

(57) ABSTRACT

A method for preparing a precursor solution for synthesis of carbon nanomaterials, where a polar solvent is added to at least one block copolymer and at least one carbohydrate compound, and the precursor solution is processed using a self-assembly process and subsequent heating to form nanoporous carbon films, porous carbon nanotubes, and porous carbon nanoparticles.

12 Claims, 2 Drawing Sheets

METHOD FOR SYNTHESIZING CARBON NANOTUBES

STATEMENT REGARDING FEDERALLY SPONSORED RESEARCH OR DEVELOPMENT

This invention was developed under Contract DE-AC04-94AL85000 between Sandia Corporation and the U.S Department of Energy. The U.S. Government has certain rights in this invention.

BACKGROUND OF THE INVENTION

This invention relates generally to a method of making carbon nanoporous materials and, more particularly, to a method of synthesizing nanoporous carbon nanotubes, nanoparticles, and films from a precursor solution comprising block copolymers and carbohydrates.

Carbon nanoporous materials, including nanoporous thin films, nanotubes, and nanoparticles, have received great attention due to their unique optical, electrical, and mechanical properties and their potential applications in nanoelectronics, sorption, and gas sensor applications. Various indirect and direct methods have been developed for the synthesis of carbon nanomaterials. For example, mesoporous carbon films have been synthesized through high temperature pyrolysis of mixtures of poly(ethylene glycol) (PEG) and poly(furfuryl alcohol). Removal of PEG during pyrolysis process led to disordered porous films with less controlled pore structure and limited accessibility and porosity. One indirect method synthesizes mesoporous carbon films with a disordered pore structure, where sucrose/silica nanocomposite films were first synthesized, followed by carbonization art high temperature and hydrogen fluoroacid etching, leading to disordered mesoporous carbon films. Through surfactant and polymer templating process, ordered mesoporous carbon films with 1-dimensional pore channels and hexagonal mesostructure have been synthesized. However, their thin film mesopore accessibility has not been demonstrated yet. In addition, the one-dimensional pore channels limit their applications where as 3-dimensional pore structures are preferred for transport.

Methods for synthesis of nanotubes have included dc arc-discharge, laser ablation, and chemical vapor deposition techniques. Recently templating methods have been developed to synthesize carbon nanotubes by carbonization of either polymer or pre-organized disc-like molecules in porous anodic aluminum oxide (AAO) membranes. In general, the carbon nanotubes synthesized using these methods exhibit either graphite-structured or amorphous tube walls with microporosity (pore size<0.5 nm). In many applications such as macromolecule sorption, separation, and sensing, carbon nanotubes with larger pores are preferred. One method synthesized hollow carbon tubes with randomly distributed 4-nm pore on the tube wall and rectangular-shape channels using mesoporous silica tubes as templates. However, this method has several limitations, including the difficulty in synthesizing tubular silica templates, controlling the tube diameter, length, and pore size on the wall and the problem of infiltrating carbon precursors into the templates which relies on capillary forces that can't guarantee complete filling of the mesopore and the entire silica tube wall. Thus, after removal of silica templates, some of the resulting carbon tubes have un-connected pores and irregular shapes. Additionally, pore size control of mesoporous carbon synthesized using silica templates is very limited because the wall thickness control of silica templates is very difficult. Generally, the pore diameter of mesoporous carbons is less than 5-nm.

DETAILED DESCRIPTION OF THE INVENTION

In the method of the present invention, a precursor solution is prepared, wherein the precursor solution is used in subsequent processing to form carbon nanoporous films, carbon nanotubes or carbon nanoparticles. The precursor solution is prepared by taking a polar solvent, including but not limited to a homogeneous dimethyl formamide (DMF) solution, tetrahydrofuran (THF), dioxane, dimethyl sulfoxide (DMSO), acetonitrile, chloroform, and cyclohexanol and adding at least one block copolymer, including but not limited to polymers such as poly(butadiene-b-acrylic acid), poly(butadiene-ethylene oxide), poly(ethylene oxide-b-propylene oxide), poly(ethylene oxide-b-methacrylic acid), poly(styrene-ethylene oxide), poly(styrene-b-vinyl pyridine), and nonionic surfactants, and at least one carbohydrate compound, including but not limited to turanose, glucose, raffinose, sucrose, pentanose, starch, and cellulose. In one embodiment, the precursor solution is formed by taking DMF and adding the block copolymer polystyrene-co-poly(4-vinylpyridine) (PS-P4VP) and a carbohydrate selected from turanose, raffinose, and sucrose.

Figure 1:
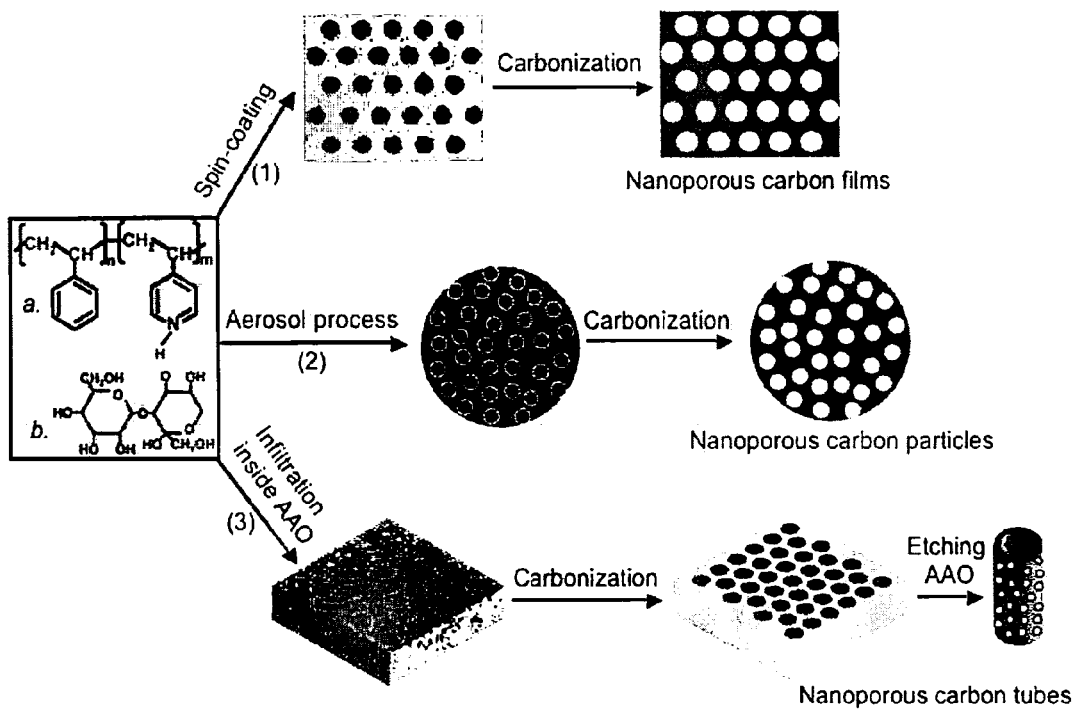
FIG. 1 illustrates the scheme for the hydrogen bonding driven self-assembly of carbohydrates and polystyrene (PS)-co-poly(4-vinylpyridine) (P4VP) and the formation of ordered, supported nanoporous carbon films.

This precursor solution can then be used in the synthesis of, in one embodiment, ordered, mesoporous films. Such continuous, ordered mesoporous films with 3-dimensionally accessibility exhibit advantageous applications in catalysis and sensor over disordered films. FIG. 1 illustrates one scheme for the hydrogen bonding driven self-assembly of carbohydrates and polystyrene (PS)-co-poly(4-vinylpyridine) (P4VP) and the formation of (1) ordered, supported nanoporous carbon films, (2) nanoporous carbon particles, and (3) nanoporous carbon tubes. Carbohydrates (such as turanose, and raffinose, sucrose, and similar carbohydrate compounds) are environmentally benign and often used as carbonization precursors. Under mild temperatures (140-180° C.), incomplete carbonization leads to formation of carboneous materials containing aromatic benzene rings and hydroxyl groups. More complete carbonization occurs at higher temperature (>400° C.). In the self-assembly and formation of ordered nanoporous carbon films, PS-PVP block copolymers are useful because PVP has same as or larger fragment sizes than PS in order to form a PS core surrounded by PVP during micro-phase separation. Addition of carbohydrates and their formation of hydrogen bonds with PVP fragments further increases PVP volume fractions, ensuring the PS core and PVP/carbohydrate shell structure. In the synthesis of nanoporous films, the precursor solution is spin-coated, or otherwise applied to a substrate, leading to the formation of ordered PS-P4VP/carbohydrates films through microphase separation as evaporation of the solvent occurs, where evaporation can occur passively by letting evaporation occur during and after the solution application to the substrate or can occur actively through manipulation of the environment (temperature and pressure) conditions. Within the films, the carbohydrates stay specifically only in the pyridine domains surrounding PS domains due to the hydrogen bonding between carbohydrates (hydroxyl groups, —OH) and pyridine blocks (nitrogen groups, —N=). After treatment at high temperature (>460° C.) in argon or other inert gas, PS and PVP fragments were removed, forming the mesoporous structure; carbohydrates were carbonized, forming the framework of mesoporous carbon films with thickness of several hundreds of nanometers.

In one embodiment, carbohydrate precursors such as turanose, raffinose, or glucose were added to dimethyl formamide (DMF) under sonication. Before adding of PS-P4VP, the carbohydrates precursors hardly dissolved in DMF at room temperature, even under the assistance of sonication. After the addition of PS-P4VP, the carbohydrate precursors quickly dissolved in DMF, which is probably due to the hydrogen bond formation between the carbohydrates and pyridine blocks.

Figure 2:
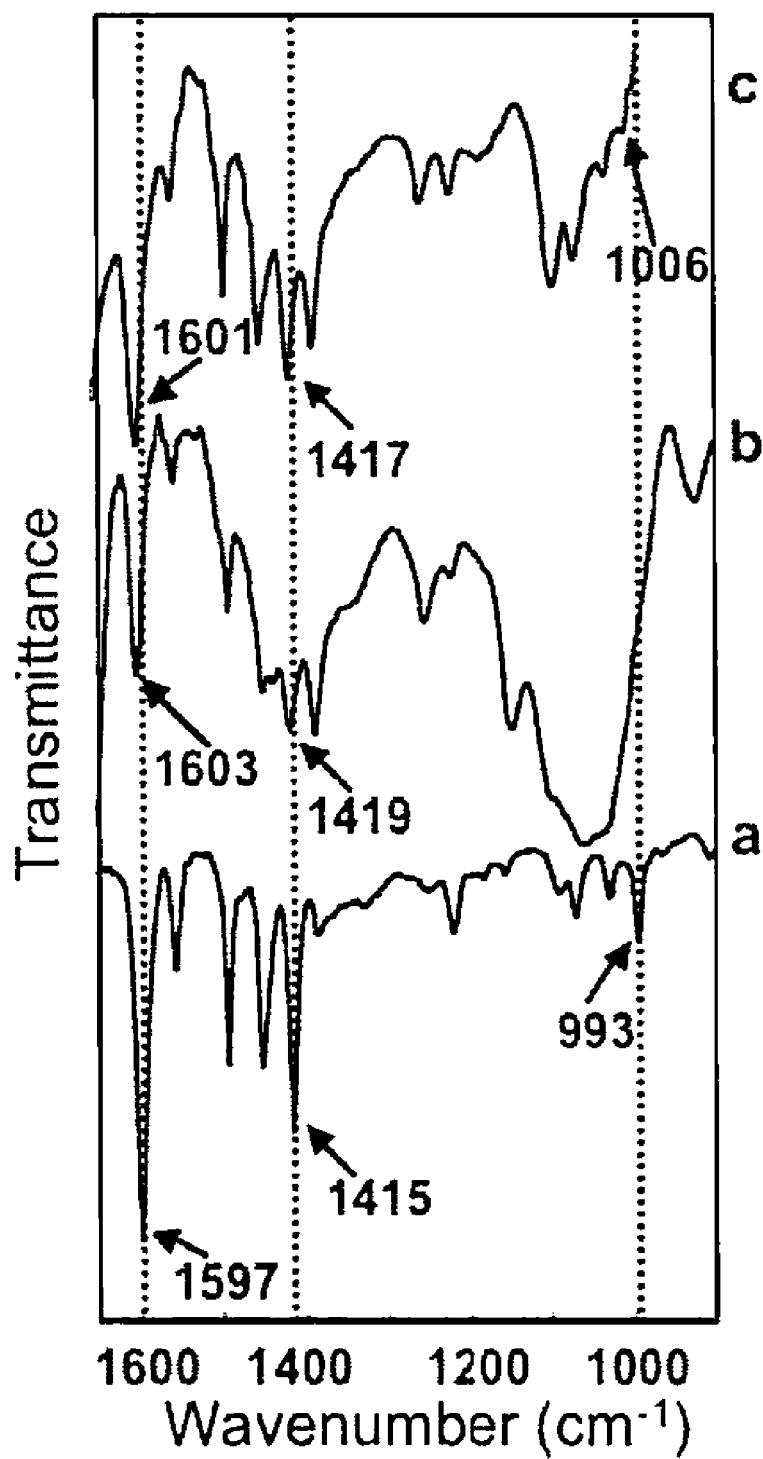
FIG. 2 shows FTIR spectra of pure PS-P4VP and ordered carbohydrate/PS-P4VP film after spin-coating and drying.

FTIR spectroscopy has provided direct evidence for the formation of hydrogen bond between hydroxyl groups of polymers and pyridine fragments. According to previous FTIR studies, hydrogen bond formation between PVP and hydroxyl groups causes the changes of the electronic distributions in the pyridine ring resulting in shifts for those related to stretching modes of pyridine ring. FIG. 2 presents the FTIR spectra of pure PS-P4VP and ordered carbohydrate/PS-P4VP film after spin-coating and drying. In comparison with the spectra of pure PS-P4VP, the PVP characteristic peaks at 1597, 1415, and 993 $cm^{-1}$ have shifted, suggesting the formation of hydrogen bond between the hydroxyl groups from carbohydrates and nitrogen groups from pyridines. Heating was favorable for the carbohydrates to rapidly dissolve in the PS-P4VP DMF solution. This is probably because heating enhances the hydrogen bonding between carbohydrate and PVP in DMF solution. Films were deposited on (100)-silicon by spin-coating at 500-2000 rpm for approximately two minutes. During spin-coating, evaporation of DMF progressively enriches the concentrations of the non-volatile constituents including carbohydrates and PS-P4VP within two minutes. Drying induces microphase separation and formation of ordered PS-P4VP/carbodryates films. The hydrogen bonding between carbohydrates and PVP blocks retains carbohydrates exclusively in PVP phase, surrounding PS phase (see FIG. 1). After annealing in DMF/benzene vapor at 80° C. for several hours, the final films were carbonized at 460° C. or higher temperatures to remove PS-PVP, producing 3-dimensional nanoporous carbon films.

Thermogravimetric studies show that significant weight loss of approximately 65 wt % occurred from 200° C. to 450° C. These weight losses are mainly attributed to the decomposition of carbohydrates and PS and PVP fragments. These results also suggest a minimum temperature to remove PS-PVP and carbonize carbohydrates to create porous carbon films at 450° C. or higher. TGA studies suggest a ~30% yield when carbonized at 600° C. and it remains constant after 600° C. From representative plan-view scanning electron microscopy (SEM) images of mesoporous carbon films, the film was determined to be macroscopically smooth and free of cracking. The films have large areas of regular in-plane hexagonal pore structure with the spatial period of ~30-nm. The cell parameter estimated from the high resolution SEM is approximately 20-nm, which is consistent with the value determined from the grazing incidence small-angle X-ray scattering (GISAXS) data.

The cell size and pore wall can be controlled by the domain size of the PS and the volume fraction of added carbohydrates. By increasing the amount of carbohydrates in the initial coating solution, the hole-to-hole distance (pore wall) in the final nanoporous carbon film increases, which suggests that the pore wall thickness increases. Representative cross-sectional SEM images of nanoporous carbon film with a thickness of ~100-nm showed that the film had undulated lamellar structure throughout the whole film thickness. The interlayer d-spacing is between 4-6-nm which is further confirmed by GISAXS studies. In comparison between the films that were prepared by different coating solutions, the films prepared by using the solution heated at 180° C. exhibited better local order and the pore structures were more uniform in pore shape and size than those prepared by using solutions without heating. This is interpreted to be because the heating improves the hydrogen bonding between carbohydrates and PVP fragments, resulting in much better ordered films. This is further confirmed by GISAXS studies. Representative plan-view TEM images were also taken, showing that the films are uniform and have local hexagonal arrays. The average cell size measured from high solution TEM image was approximately 21-nm. No graphitic microstructure was observed in the HRTEM, which suggests that the pore wall is amorphous carbon. Cross-sectional TEM images showed an undulated laminated structure with interlay d-spacing of 4-8-nm. Both SEM and TEM results concluded that the mesoporous carbon films exhibit 3-dimensional perforated lamellar pore structure.

GISAXS studies were carried out to understand better the self-assembly process and formation of ordered 3-dimensional pore nanostructure. Testing showed that the film microstructure could be somewhat controlled by annealing the as-prepared carbohydrate/PS-PVP films in different solvent vapors and changing fragment volume fraction. After spin-coating and drying, the PS-P4VP/carbohydrate films were annealed in different solvents, including DMF, benzene, tetrahydrofuran (THF), dimethylsulfoxide (DMSO), and water at 80° C. These studies showed that DMF/benzene is the best solvent pair in refining the ordering of PS-P4VP/carbohydrate films and the formation of ordered nanoporous carbon films. Other pore structures, such as worm-like and foam-like structures, were also observed. In addition to annealing in organic solvent vapors, the relative weight fractions of the domains have been used to tune film mesostructures. When less than 5 wt % of carbohydrates were used, the 3-dimensional perforated lamellar mesophase was obtained in general; increasing carbohydrates to 7 wt % or more, the mesophase changed from 3-dimensional perforated lamellar mesophase to 1-dimensional hexagonal mesophase.

A surface acoustic wave technique was used to determine pore accessibility of the supported films. Nitrogen sorption isotherms of the carbonized films show a type IV curve with a capillary condensation step at P/P0=0.5-0.8 and an H1-type hysteresis loop, suggestive of large mesopore availability. The BET surface areas, porosity, and average pore size calculated using the BJH model are 530 $m^2/g$, 40%, and 16-nm, respectively, demonstrating the accessibility of the mesophase porosity. Pore surface and framework chemistry is important sensor, sorption, and separation applications. FTIR spectra performed on the carbonized films revealed the existence of hydroxyl bands at the range of 3400-3700 $cm^{-1}$. Observed peaks at 3425, 3555 and 3633 $cm^{-1}$ correspond to the stretching band of hydrogen bonding and free —OH groups on an aromatic ring, respectively. The —OH groups can be potentially used for further pore surface functionalization through a variety of siloxane chemistry. Furthermore, the high polarity of —OH groups could potentially lead to fast and strong absorption and chemical selectivity for sensor and purification and separation applications. The peak at 3058 $cm^{-1}$ and 1600 $cm^{-1}$ corresponds to the =C—H stretching and C=C of a benzene ring, respectively. This suggests that the pore wall is consistent of aromatic benzene rings. $^{13}$C NMR spectra show a single resonance at δ=110.6 ppm, suggesting the existence of sp$^2$ type carbon species.

In another embodiment, mesoporous carbon nanotubes were prepared with larger pores (>10-nm) on the tube wall. The method involves coating of the inner pore channel surfaces of anodic aluminum oxide (AAO), or other 2- or 3-dimensional patterned structures, such as those fabricated by using photolithography, or natural materials like diatoms with block copolymer (polystyrene-co-poly(4-vinylpyridine), PS-PVP) and carbohydrates in a DMF solution (see FIG. 1). Drying of DMF induced micro-phase separation of PS-PVP and formation of ordered PS domains and PVP/carbohydrate domains. After carbonization at high temperature (>460° C.) in argon, PS and PVP fragments were removed, forming the nanopores; carbohydrates were carbonized, forming the framework of nanoporous carbon tubes within the AAO channels. Removal of the AAO leads to the formation of individual monodisperse, nanoporous carbon nanotubes.

In one embodiment to prepare the nanotubes, 0.2 g turanose and 0.1 g PS-PVP were dissolved in 1 g DMF under sonication. The solution was then heated at 180° C. for 3 hours in an autoclave to form coating solution. The solution was coated on an AAO membrane (pore diameter ~200-nm) inner pore channel surface through vacuum-driven infiltration to form a PS-PVP/turanose thin film. After drying, the coated AAO was carbonized at high temperature in argon. According to the thermogravimetric (TGA) studies, significant weight loss of ~64% occurred from 200° C. to 450° C., which was mainly attributed to the decomposition of turanose and PS-P4VP. These results suggest a minimum temperature to remove PS-P4VP and to carbonize turanose, creating pore structure at approximately 450° C. The nanotubes are straight and monodisperse with ~200-nm diameter. The high resolution SEM taken showed that the nanotubes have open ends. TEM images revealed that the nanotube wall is nanoporous with average pore size of ~25-nm. The tube wall is about 15-nm. No graphitic microstructure was observed in the high resolution TEM, which indicates that the pore wall is amorphous carbon. $^{13}$C NMR spectra showed a single resonance at &=110.6 ppm suggesting the existence of sp$^2$ type carbon species. $N_2$ isotherms on these nanotubes showed a surface area of 130 m$^2$/g with large mesopores. In addition to straight tubes, branched tubes were also observed, which is probably due to the intrinsic defects of AAO membrane. This suggests that the PS-P4VP/carbohydrate coating completely covered AAO pore channel surface. TEM images also revealed bamboo-like nanotubes. These tubes were produced when the PS-P4VP/carbohydrate coated AAO membranes were annealed at 80° C. in benzene/DMF vapor for several hours. In that case, the nanopores were distributed much more uniformly on tube surface than those of un-annealed samples, forming ordered hexagonal arrays. By using different block copolymer, the characteristics of the nanostructures on tube wall were thus able to be modified. Carbon nanotubes prepared using PS-P2VP were shown to have a rough tube surface. Individual hollow carbon particles can be uniformly distributed on the tube surface.

Similar to the confinement of block copolymer self-assembly, the formation of nanoporous carbon nanotubes is a confined hydrogen bonding self-assembly process. The hydrogen bonding between carbohydrates (hydroxyl groups) and pyridine blocks (nitrogen groups) has been confirmed by FTIR characterizations of pure PS-P4VP and PS-P4VP/carbohydrate coating. In comparison with the spectra of pure PS-P4VP, the P4VP characteristic peaks from PS-P4VP/carbohydrate coating at 1597, 1415, and 993 cm$^{-1}$ have shifted, suggesting the formation of hydrogen bonding between the hydroxyl groups from carbohydrates and nitrogen groups from pyridines. Due to the hydrogen bonding, the carbohydrates stay specifically only in the pyridine domains surrounding PS domains within the coating. AAO pore channels confined the hydrogen bonding self-assembly of PS-P4VP/carbohydrate within coatings, forming a circular shape.

Due to different self-assembly behavior, different nanopores structures have been obtained. Annealing in solvent vapor has been used to promote the block copolymer microphase separation and refine polymer nanostructure. Annealing of PS-P4VP/carbohydrate coated AAO led to the formation of bamboo-like tube structure with more ordered, hexagonal nanopore arrays.

FTIR spectra of nanotubes carbonized at 460° C. show hydroxyl bands between 3200-3600 cm$^{-1}$, suggesting that these nanotubes can be further chemically functionalized through varied siloxane chemistry.

In another embodiment, spherical nanoporous carbon particles were synthesized by combining the hydrogen bonding assisted self-assembly with an aerosol process. The process starts with the identical self-assembling solutions that were used for the synthesis of nanoporous carbon films and nanotubes. Using an aerosol apparatus, an aerosol dispersion was generated within a tubular reactor. In a continuous 6-second process, the aerosol particles were dried, heated and collected. Evaporation of DMF during drying enriched the particles in the nonvolatile species of PS-P4VP and carbohydrates, inducing PS-P4VP microphase separation and successive co-assembly and formation of PS and P4VP/carbohydrates confined to solid spherical aerosol particles. Heat treatment in argon at high temperature removed PS domains, carbonized completely the carbohydrates, and led to direct formation of spherical nanoporous carbon particles. The aerosol generator produced spherical particles with a broad particle size distribution from 1 to 10 μm. Depending on the block copolymers used and the carbohydrate concentrations, carbon particles with worm-like, vesicular, hollow structures were attained. At relatively low concentration of carbohydrates, particles with worm-like mesostructure were synthesized using PS-P4VP. Increasing the carbohydrate concentration from 3.2 wt % to 7.3 wt % resulted in a vesicular particle mesostructure. Distinct from related bulk and thin film lamellar structures that collapse on calcination, the three-dimensional connectivity of the nested spherical shells comprising the vesicular mesophase mechanically stabilizes the structure against collapse during polymer removal. Hollow carbon particles were prepared when PS-poly(ethylene oxide) was used.

EXAMPLE

Synthesis of Nanoporous Carbon Films 0.1 g of PS-P4VP ($M_n^{PS}$=12000 g·mol$^{-1}$, $M_n^{PS}$=11800 g·mol$^{-1}$ with molecular size distribution of 1.04, where $M_n^{PS}$ is the molecular weight for the polystyrene (PS) block or chain) was added into 2 g DMF followed by addition 3-10 wt % of carbohydrate compounds, including turanose, raffinose, pentose, glucose, and sucrose. The solution was sonicated for 30-60 minutes to form a homogeneous solution. The samples were then cast or spin-coated onto substrates (silicon wafer, glass slides, and gold electrodes) at 1000 rpm for 2 min. The films were allowed to dry in the fume hood and then were placed in a sealed chamber in the presence of solvent vapor, such as DMF and benzene, DMF/THF, and DMF/DMSO, for 24 hrs. The samples were removed and carbonized under an inert environment at 460° C. or higher for 1 hr using a heating rate of 1° C./min. To enhance hydrogen bonding, the coating solution was heated to 180° C. for 3 hours in an autoclave. After naturally cooling to room temperature, the solution was used to spin-coat films. The films produced were continuous, ordered, mesoporous films with 3-dimensional accessibility with thicknesses up to several hundred nanometers.

The foregoing description of the embodiments of the system and a method for making the invention have been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be defined by the claims appended hereto.

I claim:

1. A method for preparing a precursor solution for synthesis of carbon nanomaterials, comprising the steps of:
    adding a polar solvent to at least one block copolymer and at least one carbohydrate compound to form a precursor solution;
    applying the precursor solution to a substrate;
    evaporating said polar solvent to form an ordered composite film comprising separated block copolymer domains and carbohydrate compound domains; and
    heating said film in an inert gas to remove the at least one block copolymer and carbonize the carbohydrate compound, thereby forming a mesoporous carbon film.

2. The method of claim 1 wherein said at least one block copolymer is selected from the group consisting of poly(butadiene-b-acrylic acid), poly(butadiene-ethylene oxide), poly(ethylene oxide-b-propylene oxide), poly(ethylene oxide-b-methacrylic acid), poly(styrene-ethylene oxide), poly(styrene-b-vinyl pyridine), polystyrene-co-poly(4-vinylpyridine) and nonionic surfactants.

3. The method of claim 2 wherein said at least one carbohydrate is selected from the group consisting of turanose, glucose, raffinose, sucrose, pentanose, starch, and cellulose.

4. The method of claim 3 wherein said polar solvent is selected from the group consisting of dimethyl formamide (DMF) solution, tetrahydrogen furan, dioxane, dimethyl sulfoxide, acetonitrile, chloroform, and cyclohexanol.

5. The method of claim 3 wherein the concentration of the at least one carbohydrate compound is between 3-10 wt %.

6. The method of claim 3 wherein the solvent is dimethyl formamide and the at least one block copolymer is polystyrene-co-poly(4-vinylpyridine).

7. The method of claim 1 wherein said substrate is selected from the group consisting of a silicon wafer, a glass slide, and gold electrodes.

8. The method of claim 1 further comprising the step of annealing said film in a solvent vapor at an elevated temperature prior to being heated in an inert gas.

9. The method of claim 8 wherein a temperature greater than 400° C. is attained when said film is heated in an inert gas.

10. The method of claim 9 wherein the concentration of the at least one carbohydrate compound is less than 5 wt %, thereby forming a lamellar mesophase film.

11. The method of claim 9 wherein the concentration of the at least one carbohydrate compound is greater than 7 wt %, thereby forming a one-dimensional hexagonal mesophase film.

12. The method of claim 8 wherein said solvent vapor comprises compound mixtures selected from the group consisting of dimethyl formamide/benzene, dimethyl formamide/tetrahydrogen furan, and dimethyl formamide/dimethyl sulfoxide.

* * * * *